July 4, 1933.    W. F. ERRIG ET AL    1,916,258
TIRE GROOVER
Filed Sept. 26, 1932    4 Sheets-Sheet 1
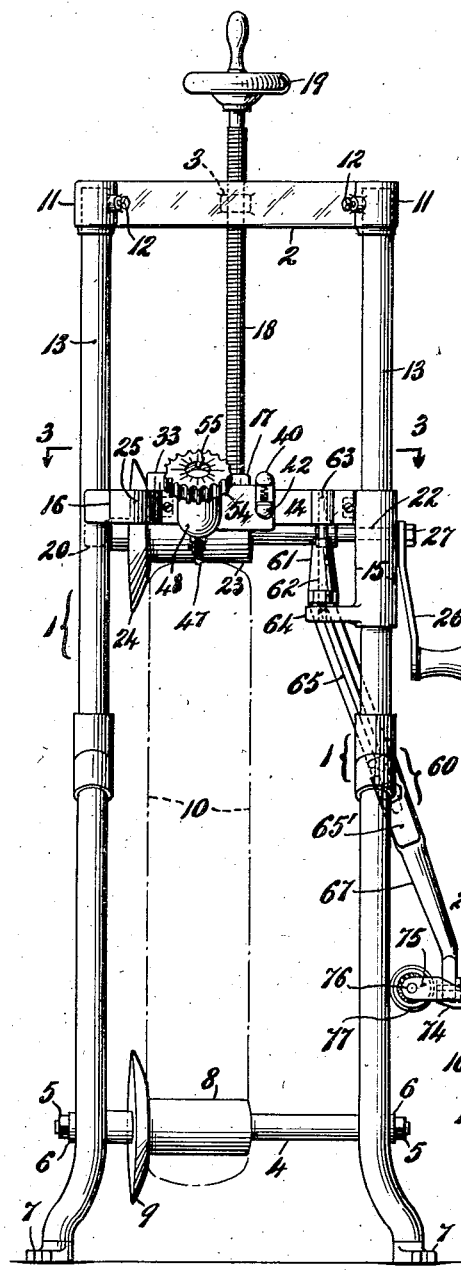
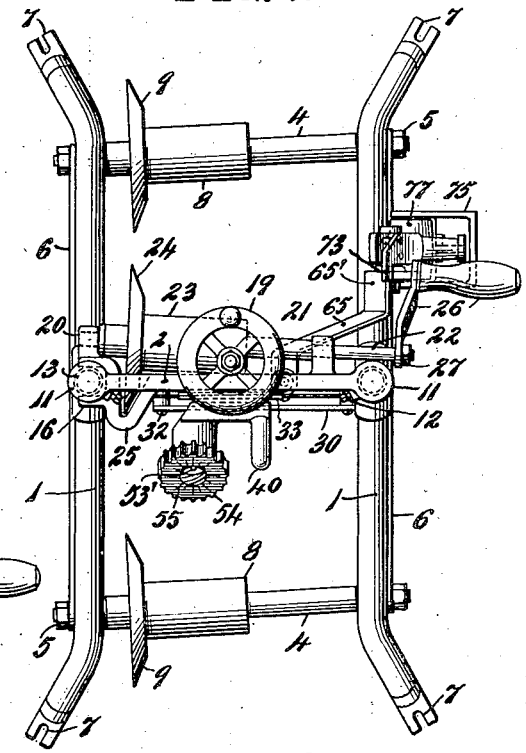
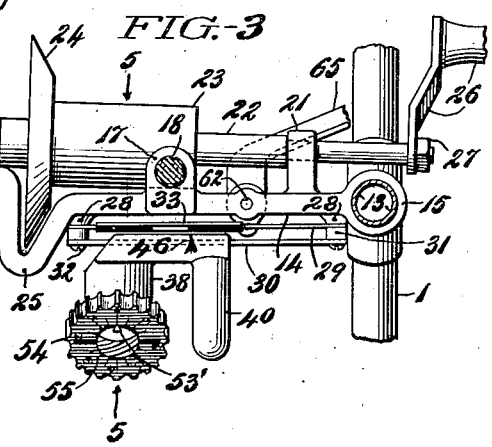
INVENTORS:
William F. Errig,
George M. Pfundt,
BY Alfred J. Bratton
THEIR ATTORNEY.

July 4, 1933. W. F. ERRIG ET AL 1,916,258
TIRE GROOVER
Filed Sept. 26, 1932   4 Sheets-Sheet 2
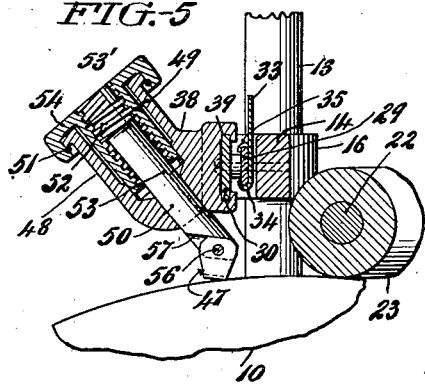
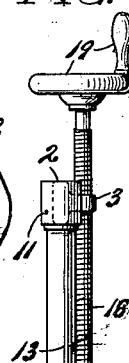
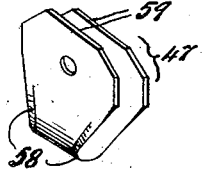
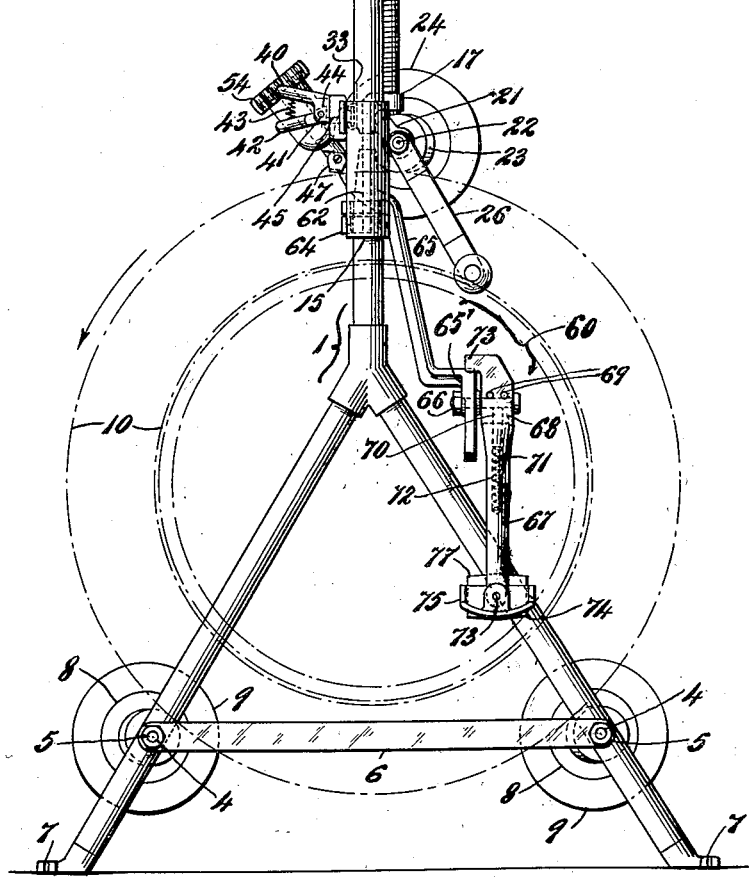
INVENTORS:
William F. Errig, Sr.
George M. Pfundt.
BY Alfred L. Bratton
THEIR ATTORNEY.

July 4, 1933. W. F. ERRIG ET AL 1,916,258
TIRE GROOVER
Filed Sept. 26, 1932 4 Sheets-Sheet 3
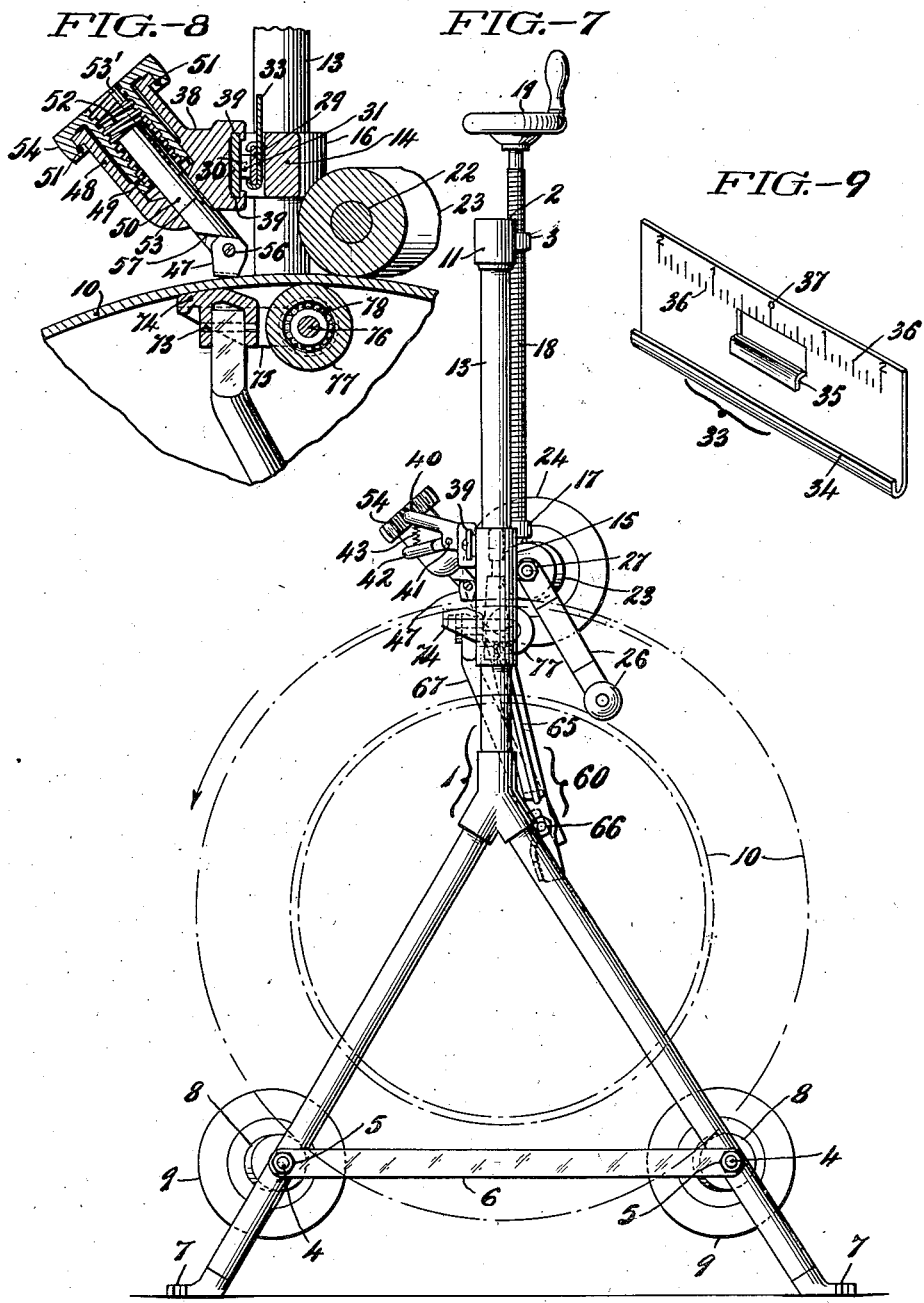
INVENTORS:
William F. Errig,
George M. Pfundt.
BY Alfred T. Bratton
THEIR ATTORNEY.

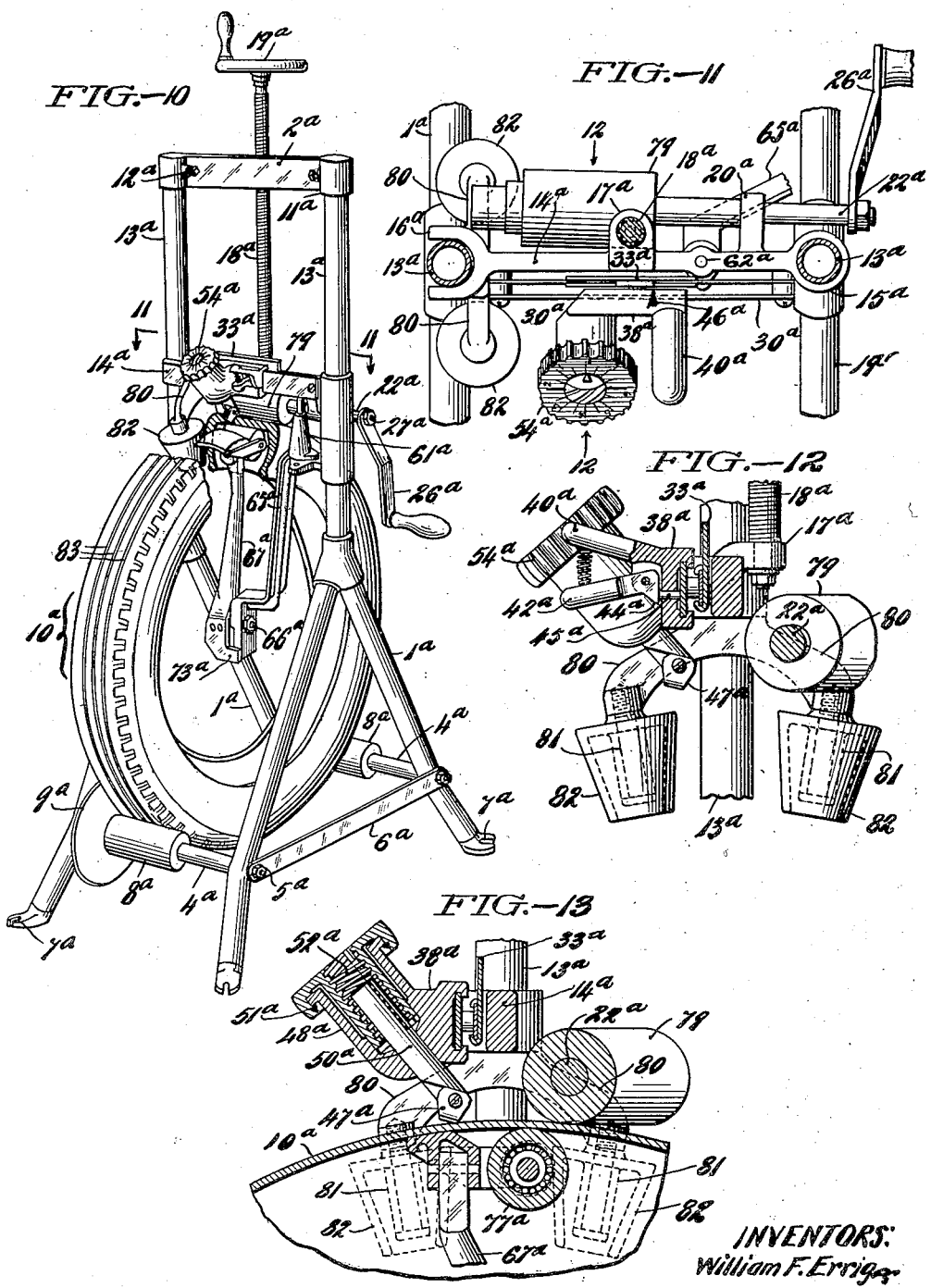

Patented July 4, 1933

1,916,258

UNITED STATES PATENT OFFICE

WILLIAM F. ERRIG, OF PHILADELPHIA, AND GEORGE M. PFUNDT, OF CHURCHVILLE, PENNSYLVANIA

TIRE GROOVER

Application filed September 26, 1932. Serial No. 634,818.

This invention relates in its broader aspects to grooving tools or machines in general for re-grooving or trimming various materials and articles the wearing faces whereof have become more or less useless for their intended purposes.

More particularly our invention has reference to tools and devices for re-grooving worn and damaged rubber-tires of all types irrespective of whether they be solid, inflated or deflated.

The primary object of our invention is the provision of a tire groover, for re-grooving the face of rubber tires, which is so designed that the material cut out is removable clear of the cutting-zone concurrently with the act of cutting or grooving, thereby facilitating the ease and quickness of the re-grooving operation.

Another object is to provide a device particularly useful for re-grooving worn tires but which, at the same time, is well adapted for grooving new solid tires, or tires which have not been moulded with grooves circumferentially thereof.

A further object is the provision of a tire re-grooving device whereby grooves of uniform depth are positively cut in the tread surface.

A still further object is to provide a device of the specified character in which the tire to be re-grooved is automatically aligned rotatively, and so maintained, during the entire period of operation thereon, whereby the new grooves are clean cut, uniform, of predetermined depth, and furthermore produced without "smoke" or "dust".

Still another object of our invention is to provide a tire groover which is manually, although not essentially, and easily operated, whereby worn tires can be re-cut or trued-up with a minimum of time and effort to look approximately new, with incidental restoration to their original non-skid safety, improved in appearance, increased in length of life, and the saving of considerable expense for renewals.

With the foregoing and ancillary objects in view, our invention consists essentially in the novel subject-matter hereinafter described and claimed, the description being supplemented by the accompanying drawings illustrative of practical embodiments thereof.

In the drawings:—

Fig. 1 is a front elevation of one practical embodiment of our invention adapted for the re-grooving of tires on any standard wheel or rim with ease and speed, said view showing a tired-wheel in position by dot-and-dash outline.

Fig. 2 is a top plan view of the same.

Fig. 3 is a section taken on the plane indicated by the arrows 3—3 in Fig. 1, but drawn to a larger scale for the sake of clearness.

Fig. 4 is a side elevation looking towards the left of Fig. 1, and with the tired-wheel similarly shown by dot-and-dash outline.

Fig. 5 is an enlarged sectional detail taken on the plane designated 5—5 in Fig. 3.

Fig. 6 is a perspective view of a cutter-blade hereinafter fully described.

Fig. 7 is a view corresponding to Fig. 4 but showing a supporting-attachment for handling deflated tires in operative position, with such a tire indicated in dot-and-dash outline.

Fig. 8 is a sectional view corresponding substantially with Fig. 5 but also illustrating the deflated tire supporting-attachment in operative position.

Fig. 9 is a perspective view of a groove-gauging scale, later on fully explained.

Fig. 10 is a perspective view of a slightly modified form of our invention with a deflated tire in position during regrooving, and having a portion of said tire broken-out to better illustrate certain important features otherwise obscured.

Fig. 11 is a sectional plan taken as indicated by the arrows 11—11 on Fig. 10.

Fig. 12 is a section taken on a vertical plane as indicated by the lines 12—12 in the preceding view; and, Fig. 13 is a sectional view corresponding substantially with Fig. 8, taken through the modified form of our invention shown in Fig. 10.

In all the views corresponding parts are designated by similar reference characters, with added exponents "*a*" in Figs. 10–13 inclusive to avoid undue repetitive description; while differing parts in the latter mentioned views are designated by appropriately distinguishing indicia.

Referring firstly and more particularly to Figs. 1 to 9 of the accompanying drawings our improved tire-groover therein illustrated comprises a framework of vertical inverted Y-standards 1, connected together at the top portions by a cross-member or head-piece 2, having an apertured-projection 3, for a purpose later explained. The Y-standards 1 are conveniently, although not essentially constructed from stout tubing, in a manner obvious to those conversant with the art, with the inverted Y-portions spacially-braced by relatively-disaligned or parallel angularly-disposed shaft members 4 held in place by securing means 5 and associated spacing tie-bars 6. The lower forked-ends are fitted with claw-feet 7 whereby the framework may be securely fixed to the floor or otherwise retained against displacement when in use.

Freely rotative on the shaft-members 4, aforesaid, are rollers 8 having bevel flanges 9 affording guidance to the tire, comprehensively designated 10 wherever shown or in dotted-outline. Attention is particularly directed, at this juncture, to the angular positioning of the axes of the rollers 8 which ensures a "creeping" tendency of the tire 10 at all times, toward the flanges 9 while being operated upon, with accompanying positive assurance that the grooves cut always parallel the sides of the tire planarly and are cut in true circumferential alignment and parallelism with each other. The cross member or head-piece 2 is provided at the ends with cupped enlargements 11 and screw-studs 12 whereby it is securely fixed to the top ends of the standards 1.

Movable up-and-down between the leg portions 13 of the standards 1 is a bearer member or carriage 14, formed at one end with a tubular portion 15, having a free slidable fit on one of the leg portions 13, and at the other end with a channel-section 16 adapted to similarly co-act with the opposing leg portion 13, as clearly understandable from Fig. 3 more particularly. It is further seen in said figure that the bearer member or carriage 14 embodies a lateral offset 17 in vertical alignment with the apertured projection 3 of the framework head-piece 2, said projection being bored and suitably-threaded for passage of a manipulator-screw 18, fitted at the upper extremity with a hand-wheel 19, and at its lower extremity rotatively secured in the lateral offset 17 aforesaid, whereby the bearer member or carriage 14 is raised and lowered, as later on explained.

The bearer member or carriage 14 also embodies laterally and downwardly-inclined differential lugs or apertured brackets 20, 21 jointly affording horizontal rotative-bearing for an operating shaft 22, the axis whereof is reversely-disposed relative to that of the shaft members 4, hereinbefore referred to, as well as with respect to the plane of the standards 1. This operating shaft 22 has secured thereon a smooth or corrugate-surfaced drive roller 23 corresponding in form to the rollers 8, that is to say it is provided with a bevel flange 24 and otherwise substantially-dimensionally conforms to said rollers 8. Disposition of the axis of the operating shaft 22 angularly-reversed to that of the rollers 8 positively ensures the "creeping" action for the tire 10 while being grooved; or, maintenance of said tire in vertical rotative position while being circumferentially grooved, as will be clear to those acquainted with such mechanical arts. It will also be noted, from Fig. 3, that the bearer member or carriage 14 is laterally indented at 25 to accommodate the flange 24 of the drive roller 23, while a suitable operating crank 26 is rigidly secured to the shaft 22, as by a lock nut 27, in conventional manner.

On the reverse side or front of the bearer member or carriage 14 are spaced bosses 28 affording rigid support for paralleling bars 29, 30 with interposition of spacers 31; said bars and spacers being secured to the bosses 28 as by screws 32. The bar 29, as best appreciated on reference to Figs. 5 and 8, serves as support for an adjustable scale 33, shown in perspective by Fig. 9, and which consists of a rectangular-section of suitable sheet-material having one longitudinal edge appropriately grooved at 34 to engage the lower edge of said bar 29, with a paralleling stamped out medially-located tongue 35 to similarly co-act with the upper edge of the bar 29. The adjustable scale 33, it will be remarked, is suitably graduated linearly at 36, in both directions, from a central zero point 37, for a purpose hereafter explained.

On the other hand, the bar 30 affords longitudinally-slidable support for a tool-holder or head 38 engaged thereon by paralleling races 39, Figs. 5 and 8, said holder embodying an outset manipulator handle 40 to which is pivoted at 41 a clamp finger 42 under the influence of an expansion spring 43 normally tending to force a heel portion 44, (Figs. 4 and 12) of said finger into engagement with a locking pin 45, or other suitable movement-restraining means, frictionally against the cutter head supporting bar 30. 46, Fig. 3, designates a suitable indicia mark on the tool holder head 38 for registration with the sliding scale zero mark 37, after initially centralizing the U-shaped cutter 47 relative to the center of the tire 10.

The tool-holder head 38 embodies an angularly-directed socket portion 48, in which is housed a tubular sleeve 49 affording adjustable-support for an axially-movable cutter-adjusting member 50; while said sleeve is rotatively retained on the head 38 by means of a snap ring 51, as will be obvious. The sleeve 49 is internally threaded for engagement with a correspondingly-threaded collar portion 52 of the adjuster member 50, while the latter is restrained against rotative movement by a suitable spline 53 in the known way; while the head portion 54 of the sleeve is circumferentially knurled for grippage purposes, and on its outer face is graduated with appropriate scale markings 55 for coaction with a zero indicia 53', conveniently the outer end of the spline 53, whereby the depth of the tire grooves may be accurately gauged and predetermined in advance of cutting the same. The U-shaped cutter 47, it will be seen, is clamped by a set screw 56 to the shouldered end 57 of the adjusting member 50, and is provided with opposed or double knife edges 58, whereby it may be readily reversed, as well as flats 59 (Fig. 6) for engagement with the shoulders of the adjuster member end 50' to prevent pivotal movement, in addition to effecting its rigid angular cutting relation with respect to the tire 10 when in use.

As above described our invention is essentially adapted for the re-grooving of solid and inflated tires, but to adapt the same for operation upon deflated tires, we provide the bearer-member or carriage 14 with a universally-movable tire supporting device for placement below the inner surface of the tire. This device is comprehensively designated 60 and comprises a journal component 61 that is vertically pivoted by a pin 62 intermediate an apertured enlargement 63 in the bearer member or carriage 14 and a laterally projecting bracket-arm 64 at the lower end of the tubular portion 15 of said carriage. The journal component 61 embodies a downwardly-directed arm 65 having an angled portion 65' to which is attached, as by a fulcrum bolt 66, or other suitable means, a second arm 67. This second arm 67 has a forked end 68 engaging over the fulcrum bolt 66 and is retained in pivotal engagement therewith by one or more pins 69, while it is longitudinally held in contact with said bolt by a plunger element 70 under the action of a spring 71, in compression; both the element 70 and spring 71 being housed in a longitudinal boring 72 in the arm 67; whereby the latter is cushioned relative to the upper arm 65, for a purpose later on set forth. It is also to be noted that the outer element of the arm forked end 68 is provided with an offset 73 for co-action with the upper arm angled end 65' to limit pivotal movement of said parts when in the inoperative position shown by Figs. 1, 2 and 4, more particularly.

At the free end of the arm 67, and at right angles to its longitudinal axis, there is pivoted by a pin 73 a shoe 74 for engagement with the inner surface of the tire 10, as best shown by Fig. 8. This shoe 74, it will be noted, is provided with yoke arms 75 having a spindle 76 rigidly secured therebetween, on which is freely rotative a roller 77 supported by an antifriction bearing 78; said roller serving under compression to aid progression of the tire 10 in conjunction with the roller drive 23 when the latter is rotated by the crank 26, while the shoe 74 affords support for said tire in opposition to the cutter 47.

Referring now more particularly to Figs. 10-13 inclusive, it is to be noted that all those parts previously described are designated by corresponding references but with added exponents "a", in order to avoid overlapping descriptive matter, as before pointed out, and, hence, only those elements or features differing therefrom will be specifically explained. The only distinguishing difference has reference to elimination of the upper tire guiding roller 23 and substitution therefor of an unflanged drive roller 79 on the operating shaft 22. In conjunction therewith we provide the bearer member or carriage 14 with downwardly-directed arms 80, having attached to their free ends convergent axes 81, affording rotative antifriction bearing for coned-rollers 82, which spacially-coact with the side of the tire 10, in a manner obvious from Fig. 10, instead of the single bevel flange 24 of the embodiment illustrated by Figs. 1 to 9, thereby materially reducing friction against the sides of the tire 10. We have also found in actual practice that the coned rollers 82 not only serve to effect the "creeping" tendency hereinbefore explained with reference to the tire 10, during the groove cutting, but that they effectively maintain said tire properly centralized relative to the scale zero 37 during the cutting of grooves 83, Fig. 10, to the right and left hand thereof.

In use it will be apparent that all the operator has to do is to first adjust the drive roller 23 or 79 by manipulation of the hand wheel 19 or 19a to raise and lower the bearer member or carriage 14 or 14a until said rollers engage the tread surface of a tire 10 placed in the machine. The drive roller 23 or 79 is thereupon tightened down just sufficiently for rotative frictional-engagement with the tire 10, whereupon the grooving cutter 47 is moved to the desired position by the handle 40, and graduated as to depth of the cut by turning the head 54, and then by turning the operating crank 26 a complete circumferential groove 83 is readily cut in a few seconds. Obviously by moving the cutter head 38 relative to the scale 33, in the manner hereinbefore explained, paralleling circumferential grooves 83 may be similarly and expeditiously cut with a minimum expenditure of time and labor, and with pre-assurance that such grooves will be clean cut and uniform in depth.

While excellent results have been obtained from the groove cutters hereinbefore disclosed, we prefer that the general constructive details be followed. However, within the scope of the following claims, it will be evident that numerous changes and modifications may be made in adapting our invention to other uses than that of grooving tires, as set forth. Therefore the right is hereby reserved to make all such modifications lying within the scope of said claims.

Having thus described our invention what we claim is:—

1. In a tire groover the combination of a plurality of freely-rotative tire-supporting rollers the axes whereof are parallel, a spaced drive roller the axis of which is angularly-directed relative to the axes of the supporting rollers, means whereby the drive roller is adjustable relative to the supporting rollers to effect rotation of the tire, a tool for cutting grooves in the tread of the tire, and means whereby said drive roller is rotated to effect grooving of the tire.

2. In a tire groover the combination of a plurality of freely-rotative tire-supporting rollers the axes whereof are parallel, a spaced drive roller the axis of which is angularly-directed relative to the axes of the supporting rollers, a plurality of freely mounted rollers at one end of the drive roller and revolvable in a plane substantially at right angles to the axis of said drive roller, means whereby the drive roller and associated end rollers are adjustable towards or away from the supporting rollers to effect rotation of the tire and its placement between or removal therefrom, a tool for cutting grooves in the tread of the tire, and means whereby said drive roller is rotatable to effect grooving of the tire.

3. In a tire groover the combination of a plurality of freely-rotative tire-supporting rollers the axes whereof are parallel, a spaced drive roller the axis of which is angularly-directed relative to the axes of the supporting rollers, means whereby the drive roller is adjustable relative to the supporting rollers to effect frictional-rotation of the tire, a laterally adjustable tool for cutting groovers in the tread of the tire, associated gauge means for determining the spacial relation of the grooves to be cut, and means whereby the drive roller is rotated to effect the tire grooving operation.

4. In a tire groover the combination of a triad of horizontally-disposed relatively equi-spaced obliquely-arranged rollers, the axes of two of which are parallel and reversely-oblique relative to the third roller, said rollers jointly serving to sustain a tire rotatively vertical, means for adjusting the last mentioned roller vertically to insert a tire into the groover and to rotate said tire, a laterally movable cutter for grooving the tire tread, associated gauge means for determining the depth and spacial relation of the grooves cut, and means whereby the third roller is rotatable to frictionally revolve the tire during the grooving operation.

5. In a tire groover the combination of a triad of horizontally-disposed relatively equi-spaced obliquely-arranged rollers, the axes of two of which are parallel and reversely-oblique relative to the third roller, said rollers jointly serving to sustain a tire rotatively vertical, means for adjusting the last mentioned roller vertically to insert a tire into the groover and to rotate said tire, a laterally movable cutter for grooving the tire tread, means for clamping the cutter centrally of the tire tread, said clamping means bearing a suitable index, a gauge cooperative with said index for spacially controlling the grooves cut, and means whereby the third roller is rotatable to frictionally revolve the tire to effect the grooving operation.

6. In a tire groover the combination of a triad of horizontally-disposed relatively equi-spaced obliquely-arranged rollers, the axes of two of which are parallel and reversely-oblique relative to the third roller, said rollers jointly serving to sustain a tire rotatively vertical, means for adjusting the last mentioned roller vertically to insert a tire into the groover and to rotate said tire, a laterally movable cutter for grooving the tire tread, means for clamping the cutter centrally of the tire tread, said clamping means bearing a suitable index, a gauge cooperative with said index for spacially controlling the grooves cut, micrometer means for adjusting the depth of the groove to be cut, and means whereby the third roller is rotatable to frictionally revolve the tire to effect the grooving operation.

7. In a tire groove the combination of a triad of horizontally-disposed relatively equi-spaced obliquely-arranged rollers, the axes of two of which are parallel and reversely-oblique relative to the third roller, said rollers jointly serving to sustain a tire rotatively vertical, means for adjusting the last mentioned roller vertically to insert a tire into the groover and to rotate said tire, a laterally movable cutter for grooving the tire tread, means for clamping the cutter centrally of the tire tread, said clamping means bearing a suitable index, a gauge cooperative with said index for spacially controlling the grooves cut, micrometer means for adjusting the depth of the groove to be cut, universally-movable compressive means adapted to support the tire below the cutter and third roller aforesaid, and means whereby said third roller is rotatable to frictionally revolve the tire during the grooving operation.

8. A tire groover comprising spaced standards, a plurality of horizontally-disposed obliquely-arranged flanged rollers journaled between said standards and at a low level thereof, a carriage guided in the upper part of the standards and affording bearing for a flanged drive roller the axis whereof is reversely-oblique relative to the axes of the lower rollers, said rollers jointly serving to revolvably support the tire in a vertical plane, means for raising and lowering the carriage to respectively insert a tire into the groover and to rotate said tire, a tool holder for cutting grooves circumferentially of the tire carried by and movable along the carriage and having means for initially clamping it in registration with the center of the tire tread, an index on the tool holder and a movable co-acting scale also carried by the carriage and arrestable relative to said index whereby spacing of the grooves is accurately determined, a micrometrically-adjustable cutter in said tool holder for regulating the depth of the grooves cut, and means whereby the drive roller is rotatable to frictionally revolve the tire during the grooving operation.

9. The combination of claim 8, in which the lower tire-supporting and upper tire revolving rollers embody bevel flanges.

10. The combination of claim 8 in which the spaced standards are of inverted Y-formation with ties across the fork portions.

11. The combination of claim 8 in which the spaced standards are constructed of tubing to inverted Y-formation and have claw feet at the extremities of the fork portion.

12. The combination of claim 8 in which the carriage consists of a member embodying an angularly-related sleeve at one end with a channel-section at the other, and an intermediate vertically-apertured screw-threaded offset.

13. The combination of claim 8 in which the carriage consists of a member embodying a rectangularly-related sleeve at one end with a radially-directed bearing bracket, a channel-section at the other end, an intermediate vertically-apertured screw-threaded offset, and a lateral indent proximate one end of said member to accommodate the flange of the drive roll.

14. The combination of claim 8 in which the carriage consists of a member embodying a rectangularly-related sleeve at one end with a radially-directed bearing bracket, a channel-section at the other end, an intermediate vertically-apertured screw-threaded offset, and opposing pendent arms affording convergent bearing for rotative rolls.

15. The combination of claim 8 in which the tool holder is movable along a bar supported by the carriage and includes a spring-influenced latch lock for frictional engagement with said bar.

16. The combination of claim 8 in which the scale member is movable along a bar supported by the carriage and is adapted for frictional arrest thereon in registration with the index of the tool holder, said scale having a grooved longitudinal edge with a paralleling reversely-directed tongue whereby it is slidably mounted, and a right-and-left handedly-directed linear gauge on said member.

17. A tire groover comprising spaced standards, a plurality of horizontally-disposed obliquely-arranged flanged rollers journaled between said standards and at a low level thereof, a carriage guided in the upper part of the standards and affording bearing for a flanged drive roller the axis whereof is reversely-oblique relative to the axes of the lower rollers, said rollers jointly serving to revolvably support the tire in a vertical plane, means for raising and lowering the carriage to respectively insert a tire into the groover and to rotate said tire, a tool holder for cutting grooves circumferentially of the tire carried by and movable along the carriage and having means for initially clamping it in registration with the center of the tire tread, an index on the tool holder and a movable co-acting scale also carried by the carriage and arrestable relative to said index whereby spacing of the grooves is accurately determined, a micrometrically-adjustable cutter in said tool holder for regulating the depth of the grooves cut, universally-movable compressive means adapted to support a tire shoe below the cutter and drive roller aforesaid, and means whereby said drive roller is rotatable to frictionally revolve the tire during the grooving operation.

18. The combination of claim 17 in which the universally-movable compressive means comprises a downwardly-directed arm vertically-pivoted at its upper end and embodying an angled portion with a horizontal pivot at the other end, a lower arm fulcrumed on said pivot, means whereby the lower arm has capacity for longitudinal sliding movement relative to the horizontal pivot, and a combination supporting shoe and roller oscillatably-mounted at the free end of said lower arm.

19. The combination of claim 17 in which the universally-movable compressive means comprises a downwardly-directed arm vertically-pivoted at its upper end and embodying an angled portion with a horizontal pivot at the other end, a lower arm fulcrumed on said pivot, means whereby the lower arm has capacity for longitudinal sliding movement relative to the horizontal pivot, a combination shoe and antifrictionally-journaled roller pivotally mounted at the free end of the lower arm for oscillation in the plane of the longitudinal axis, and stop means for arresting said lower arm when folded up or down relative to the first mentioned arm.

20. The combination of claim 8 in which the tool holder cutter is of U-formation with opposedly angled twin-knife edges whereby it may be reversed for grooving purposes, and also embodying flats whereby it is rigidly positioned relative to the holder.

21. A tire groover comprising spaced standards, a plurality of horizontally-disposed obliquely-arranged flanged-rollers journaled between said standards at a low level thereof, a carriage guided in the upper part of the standards and affording bearing for a cylindric drive roller the axis whereof is reversely oblique relative to the axes of the lower rollers, said rollers jointly serving to rotatively-sustain the tire, means for raising and lowering the carriage to respectively insert a tire in the groover and to frictionally engage the drive roller on said tire, opposedly-directed pendent arms on the carriage having downwardly-converging axes for coned rollers engageable against one side of the tire to maintain said tire rotative in a vertical plane, a tool holder for cutting grooves circumferentially of the tire laterally movable along the carriage, means for clamping said holder relative to the tire-tread lateral-center, an index on the holder, a co-acting groove spacing scale arrestable relative to the tool holder index, a micrometrically-adjustable cutter in the tool holder for determining the depth of the grooves cut, and means whereby the drive roller is rotatable to frictionally revolve the tire during the grooving operation.

22. A tire groover comprising spaced standards, a plurality of horizontally-disposed obliquely-arranged flanged-rollers journaled between said standards at a low level thereof, a carriage guided in the upper part of the standards and affording bearing for a cylindric drive roller the axis whereof is reversely oblique relative to the axes of the lower rollers, said rollers jointly serving to rotatively-sustain the tire, mean for raising and lowering the carriage to respectively insert a tire in the groover and to frictionally engage the drive roller on said tire, opposedly-directed pendent arms on the carriage having downwardly-converging axes for coned rollers engageable against one side of the tire to maintain said tire rotative in a vertical plane, a tool holder for cutting grooves circumferentially of the tire laterally movable along the carriage, means for clamping said holder relative to the tire-tread lateral-center, an index on the holder, a co-acting groove spacing scale arrestable relative to the tool holder index, a micrometrically-adjustable cutter in the tool holder for determining the depth of the grooves cut, universally-movable compressive means pivotally supported by the carriage aforesaid adapted to engage the inner surface of the tire proximately below the cutter and drive roller, and means whereby the drive roller is rotatable to frictionally revolve the tire during the grooving operation.

23. In a groover, the combination of a plurality of rotatable article-supporting rollers the axes whereof are parallel, a spaced drive roller the axis of which is angularly directed relative to the axes of the supporting rollers whereby an article to be grooved is maintained in a vertical rotative position and means for cutting grooves in the face of the article, one of said rollers being adapted to effect rotation of the article during the grooving operation.

24. In a tire groover, the combination of a plurality of freely-rotative tire-supporting rollers the axes whereof are parallel, a spaced drive roller the axis of which is angularly directed relative to the axes of said supporting rollers whereby a tire is maintained in a vertical rotative position, means for cutting grooves in the tread of the tire, and means whereby said drive roller is rotated to effect grooving of the tire.

25. In a tire groover, the combination of a plurality of rotatable tire-supporting rollers embodying flanges, a spaced drive roller having its axis angularly disposed in relation to the axes of said supporting rollers whereby a tire is caused to creep toward the flanges of said supporting rollers, means for cutting grooves in the tread of the tire and means whereby said drive roller is rotated to effect grooving of the tire.

In testimony whereof we affix our signatures this 19th day of September, 1932, at Fox Chase, in the city and county of Philadelphia, Pennsylvania, U. S. A.

WILLIAM F. ERRIG. [L. S.]
GEORGE M. PFUNDT [L. S.]